(12) United States Patent
Green

(10) Patent No.: US 9,012,079 B2
(45) Date of Patent: Apr. 21, 2015

(54) ELECTRODE COMPRISING STRUCTURED SILICON-BASED MATERIAL

(75) Inventor: Mino Green, London (GB)

(73) Assignee: Nexeon Ltd, Oxfordshire (GB)

( * ) Notice: Subject to any disclaimer, the term of this patent is extended or adjusted under 35 U.S.C. 154(b) by 1160 days.

(21) Appl. No.: 12/669,203

(22) PCT Filed: Jul. 17, 2008

(86) PCT No.: PCT/GB2008/002453
§ 371 (c)(1),
(2), (4) Date: Feb. 26, 2010

(87) PCT Pub. No.: WO2009/010759
PCT Pub. Date: Jan. 22, 2009

(65) Prior Publication Data
US 2010/0190057 A1    Jul. 29, 2010

(30) Foreign Application Priority Data

Jul. 17, 2007  (GB) .................................. 0713896.9

(51) Int. Cl.
*H01M 4/13*      (2010.01)
*H01M 4/38*      (2006.01)
*H01M 4/04*      (2006.01)
*H01M 4/485*     (2010.01)
(Continued)

(52) U.S. Cl.
CPC .............. *H01M 4/38* (2013.01); *H01M 4/0492* (2013.01); *H01M 4/485* (2013.01); *H01M 4/661* (2013.01); *H01M 4/662* (2013.01); *H01M 10/0525* (2013.01); *H01M 4/134* (2013.01); *H01M 4/1395* (2013.01); *H01M 4/386* (2013.01); *H01M 2004/027* (2013.01); *Y02E 60/122* (2013.01)

(58) Field of Classification Search
CPC .... H01M 4/134; H01M 4/1395; H01M 4/386
USPC ......... 429/209, 218.1, 231.95, 226, 219, 221, 429/223, 225
See application file for complete search history.

(56) References Cited

U.S. PATENT DOCUMENTS 3,351,445 A   11/1967  Fielder et al.
4,002,541 A   1/1977   Streander
(Continued)

FOREIGN PATENT DOCUMENTS

CN    101442124 A       5/2009
DE    199 22 257 A1    11/2000
(Continued)

OTHER PUBLICATIONS

Chan et al., "High-performance lithium battery anodes using silicon nanowires", Dec. 16, 2007, Nature Nanotechnology, vol. 3, Jan. 2008, pp. 31-32.*
(Continued)

*Primary Examiner* — Milton I Cano
*Assistant Examiner* — Jimmy K Vo
(74) *Attorney, Agent, or Firm* — McDonnell Boehnen Hulbert & Berghoff LLP

(57) ABSTRACT

A composite electrode includes an active component directly bonded to a current collector. The direct bonding provides a low resistance contact between the current collector and the active material. The active component can be provided as fibers of silicon. The fibers can be free or attached to a support.

21 Claims, 2 Drawing Sheets

(51) Int. Cl.
  *H01M 4/66* (2006.01)
  *H01M 10/0525* (2010.01)
  *H01M 4/134* (2010.01)
  *H01M 4/1395* (2010.01)
  *H01M 4/02* (2006.01)

(56) References Cited

U.S. PATENT DOCUMENTS

| | | |
|---|---|---|
| 4,436,796 A | 3/1984 | Huggins et al. |
| 4,950,566 A | 8/1990 | Huggins et al. |
| 5,260,148 A | 11/1993 | Idota |
| 5,262,021 A | 11/1993 | Lehmann et al. |
| 5,660,948 A | 8/1997 | Barker |
| 5,907,899 A | 6/1999 | Dahn et al. |
| 5,980,722 A | 11/1999 | Kuroda et al. |
| 6,022,640 A | 2/2000 | Takada et al. |
| 6,042,969 A | 3/2000 | Yamada et al. |
| 6,063,995 A | 5/2000 | Bohland et al. |
| 6,235,427 B1 | 5/2001 | Idota et al. |
| 6,296,969 B1 | 10/2001 | Yano et al. |
| 6,334,939 B1 | 1/2002 | Zhou et al. |
| 6,337,156 B1 | 1/2002 | Narang et al. |
| 6,353,317 B1 | 3/2002 | Green et al. |
| 6,399,177 B1 | 6/2002 | Fonash et al. |
| 6,399,246 B1 | 6/2002 | Vandayburg et al. |
| 6,589,696 B2 | 7/2003 | Matsubara et al. |
| 6,605,386 B1 | 8/2003 | Kasamatsu et al. |
| 6,620,547 B1 | 9/2003 | Sung et al. |
| 6,887,511 B1 | 5/2005 | Shima et al. |
| 6,916,679 B2 | 7/2005 | Snyder et al. |
| 7,033,936 B1 | 4/2006 | Green |
| 7,051,945 B2 | 5/2006 | Empedocles et al. |
| 7,070,632 B1 | 7/2006 | Visco et al. |
| 7,094,499 B1 | 8/2006 | Hung |
| 7,147,894 B2 | 12/2006 | Zhou et al. |
| 7,192,673 B1 | 3/2007 | Ikeda et al. |
| 7,311,999 B2 | 12/2007 | Kawase et al. |
| 7,318,982 B2 | 1/2008 | Gozdz et al. |
| 7,348,102 B2 | 3/2008 | Li et al. |
| 7,358,011 B2 | 4/2008 | Fukuoka et al. |
| 7,378,041 B2 | 5/2008 | Asao et al. |
| 7,425,285 B2 | 9/2008 | Asao et al. |
| 7,476,469 B2 | 1/2009 | Ota et al. |
| 7,569,202 B2 | 8/2009 | Farrell et al. |
| 7,659,034 B2 | 2/2010 | Minami et al. |
| 7,674,552 B2 | 3/2010 | Nakai et al. |
| 7,767,346 B2 | 8/2010 | Kim et al. |
| 7,862,933 B2 | 1/2011 | Okumura et al. |
| 8,034,485 B2 | 10/2011 | Dahn et al. |
| 2001/0023986 A1 | 9/2001 | Mancevski |
| 2003/0135989 A1 | 7/2003 | Huggins et al. |
| 2004/0072067 A1 | 4/2004 | Minami et al. |
| 2004/0126659 A1 | 7/2004 | Graetz et al. |
| 2004/0151987 A1 | 8/2004 | Kawase et al. |
| 2004/0166319 A1 | 8/2004 | Li et al. |
| 2004/0185346 A1 | 9/2004 | Takeuchi et al. |
| 2004/0197660 A1 | 10/2004 | Sheem et al. |
| 2004/0214085 A1 | 10/2004 | Sheem et al. |
| 2004/0224231 A1 | 11/2004 | Fujimoto et al. |
| 2004/0241548 A1 | 12/2004 | Nakamoto et al. |
| 2005/0042515 A1 | 2/2005 | Hwang et al. |
| 2005/0079414 A1 | 4/2005 | Yamamoto et al. |
| 2005/0079420 A1 | 4/2005 | Cho et al. |
| 2005/0118503 A1 | 6/2005 | Honda et al. |
| 2005/0191550 A1 | 9/2005 | Satoh et al. |
| 2005/0193800 A1 | 9/2005 | DeBoer et al. |
| 2005/0214644 A1 | 9/2005 | Aramata et al. |
| 2006/0003226 A1 | 1/2006 | Sawa et al. |
| 2006/0004226 A1 | 1/2006 | Machhammer et al. |
| 2006/0019115 A1 | 1/2006 | Wang et al. |
| 2006/0019168 A1 | 1/2006 | Li et al. |
| 2006/0024582 A1 | 2/2006 | Li et al. |
| 2006/0051670 A1 | 3/2006 | Aramata et al. |
| 2006/0057463 A1 | 3/2006 | Gao et al. |
| 2006/0088767 A1 | 4/2006 | Li et al. |
| 2006/0097691 A1 | 5/2006 | Green |
| 2006/0134516 A1 | 6/2006 | Im et al. |
| 2006/0134518 A1 | 6/2006 | Kogetsu et al. |
| 2006/0147800 A1 | 7/2006 | Sato et al. |
| 2006/0154071 A1 | 7/2006 | Homma et al. |
| 2006/0166093 A1 | 7/2006 | Zaghib et al. |
| 2006/0175704 A1 | 8/2006 | Shimizu et al. |
| 2006/0257307 A1 | 11/2006 | Yang |
| 2006/0263687 A1 | 11/2006 | Leitner et al. |
| 2006/0275663 A1 | 12/2006 | Matsuno et al. |
| 2006/0275668 A1 | 12/2006 | Peres et al. |
| 2006/0286448 A1 | 12/2006 | Snyder et al. |
| 2007/0026313 A1 | 2/2007 | Sano |
| 2007/0031733 A1 | 2/2007 | Kogetsu et al. |
| 2007/0037063 A1 | 2/2007 | Choi et al. |
| 2007/0048609 A1 | 3/2007 | Yeda et al. |
| 2007/0059598 A1 | 3/2007 | Yang |
| 2007/0065720 A1 | 3/2007 | Hasegawa et al. |
| 2007/0072074 A1 | 3/2007 | Yamamoto et al. |
| 2007/0087268 A1 | 4/2007 | Kim et al. |
| 2007/0099084 A1 | 5/2007 | Huang et al. |
| 2007/0099085 A1 | 5/2007 | Choi et al. |
| 2007/0105017 A1 | 5/2007 | Kawase et al. |
| 2007/0117018 A1 | 5/2007 | Huggins |
| 2007/0122702 A1 | 5/2007 | Sung et al. |
| 2007/0148544 A1 | 6/2007 | Le |
| 2007/0172732 A1 | 7/2007 | Jung et al. |
| 2007/0184345 A1 | 8/2007 | Neudecker et al. |
| 2007/0190413 A1 | 8/2007 | Lee et al. |
| 2007/0202395 A1 | 8/2007 | Snyder et al. |
| 2007/0202402 A1 | 8/2007 | Asahina et al. |
| 2007/0207080 A1 | 9/2007 | Yang |
| 2007/0207385 A1 | 9/2007 | Liu et al. |
| 2007/0209584 A1 | 9/2007 | Kalynushkin et al. |
| 2007/0212538 A1 | 9/2007 | Niu |
| 2007/0218366 A1 | 9/2007 | Kalynushkin et al. |
| 2007/0224508 A1 | 9/2007 | Aramata et al. |
| 2007/0224513 A1 | 9/2007 | Kalynushkin et al. |
| 2007/0238021 A1 | 10/2007 | Liu et al. |
| 2007/0243469 A1 | 10/2007 | Kim et al. |
| 2007/0264564 A1 | 11/2007 | Johnson et al. |
| 2007/0264574 A1 | 11/2007 | Kim et al. |
| 2007/0269718 A1 | 11/2007 | Krause et al. |
| 2007/0277370 A1 | 12/2007 | Kalynushkin et al. |
| 2008/0003496 A1 | 1/2008 | Neudecker et al. |
| 2008/0003503 A1 | 1/2008 | Kawakami et al. |
| 2008/0020281 A1 | 1/2008 | Kogetsu et al. |
| 2008/0038638 A1 | 2/2008 | Zhang et al. |
| 2008/0090149 A1 | 4/2008 | Sano et al. |
| 2008/0096110 A1 | 4/2008 | Bito et al. |
| 2008/0107967 A1 | 5/2008 | Liu et al. |
| 2008/0113271 A1 | 5/2008 | Ueda et al. |
| 2008/0118834 A1 | 5/2008 | Yew et al. |
| 2008/0124631 A1 | 5/2008 | Fukui et al. |
| 2008/0131782 A1 | 6/2008 | Hagiwara et al. |
| 2008/0138710 A1 | 6/2008 | Liaw et al. |
| 2008/0138716 A1 | 6/2008 | Iwama et al. |
| 2008/0145752 A1 | 6/2008 | Hirose et al. |
| 2008/0145759 A1 | 6/2008 | Sung et al. |
| 2008/0160415 A1 | 7/2008 | Wakita et al. |
| 2008/0176139 A1 | 7/2008 | White et al. |
| 2008/0206631 A1 | 8/2008 | Christensen et al. |
| 2008/0206641 A1 | 8/2008 | Christensen et al. |
| 2008/0233479 A1 | 9/2008 | Sung et al. |
| 2008/0233480 A1 | 9/2008 | Sung et al. |
| 2008/0241647 A1 | 10/2008 | Fukui et al. |
| 2008/0241703 A1 | 10/2008 | Yamamoto et al. |
| 2008/0248250 A1 | 10/2008 | Flemming et al. |
| 2008/0261112 A1 | 10/2008 | Nagata et al. |
| 2008/0305391 A1 | 12/2008 | Hirose et al. |
| 2009/0053589 A1 | 2/2009 | Obrovac et al. |
| 2009/0078982 A1 | 3/2009 | Rachmady et al. |
| 2009/0087731 A1 | 4/2009 | Fukui et al. |
| 2009/0101865 A1 | 4/2009 | Matsubara et al. |
| 2009/0117466 A1 | 5/2009 | Zhamu et al. |
| 2009/0186267 A1 | 7/2009 | Tiegs |
| 2009/0239151 A1 | 9/2009 | Nakanishi et al. |
| 2009/0253033 A1 | 10/2009 | Hirose et al. |
| 2009/0269677 A1 | 10/2009 | Hirose et al. |

(56) References Cited

U.S. PATENT DOCUMENTS

| | | |
|---|---|---|
| 2009/0305129 A1 | 12/2009 | Fukui et al. |
| 2010/0085685 A1 | 4/2010 | Pinwill |
| 2010/0092868 A1 | 4/2010 | Kim et al. |
| 2010/0124707 A1 | 5/2010 | Hirose et al. |
| 2010/0136437 A1 | 6/2010 | Nishida et al. |
| 2010/0285358 A1 | 11/2010 | Cui et al. |
| 2010/0297502 A1 | 11/2010 | Zhu et al. |
| 2010/0330419 A1 | 12/2010 | Cui et al. |

FOREIGN PATENT DOCUMENTS

| | | |
|---|---|---|
| DE | 103 47 570 A1 | 5/2005 |
| EP | 0 281 115 | 9/1988 |
| EP | 0 553 465 A1 | 8/1993 |
| EP | 0 820 110 A2 | 1/1998 |
| EP | 1 011 160 A1 | 6/2000 |
| EP | 0 936 687 B1 | 12/2001 |
| EP | 1 231 653 A1 | 8/2002 |
| EP | 1 231 654 A1 | 8/2002 |
| EP | 1 258 937 A1 | 11/2002 |
| EP | 1 083 614 B1 | 5/2003 |
| EP | 1 313 158 A2 | 5/2003 |
| EP | 1 335 438 A1 | 8/2003 |
| EP | 1 289 045 B1 | 3/2006 |
| EP | 1 657 769 A1 | 5/2006 |
| EP | 1 850 409 A1 | 10/2007 |
| EP | 1 771 899 B1 | 2/2008 |
| EP | 1 657 768 B1 | 5/2008 |
| EP | 2 058 882 | 5/2009 |
| EP | 2 204 868 A3 | 7/2010 |
| FR | 2 885 913 B1 | 8/2007 |
| GB | 980513 | 1/1965 |
| GB | 1 014 706 | 12/1965 |
| GB | 2 395 059 A | 5/2004 |
| GB | 2 464 157 B | 1/2010 |
| GB | 2 464 158 | 4/2010 |
| JP | 02-209492 A | 8/1990 |
| JP | 6-283156 | 10/1994 |
| JP | 10-046366 | 2/1998 |
| JP | 10-83817 | 3/1998 |
| JP | 10-199524 | 7/1998 |
| JP | 2000-3727 | 1/2000 |
| JP | 2000003731 A | 1/2000 |
| JP | 2000-173594 | 6/2000 |
| JP | 2000-348730 A | 12/2000 |
| JP | 2001-291514 | 10/2001 |
| JP | 2002-279974 A | 9/2002 |
| JP | 2002-313319 A | 10/2002 |
| JP | 2003-017040 | 1/2003 |
| JP | 2003-168426 | 6/2003 |
| JP | 04-607488 | 2/2004 |
| JP | 2004-71305 | 3/2004 |
| JP | 2004-095264 | 3/2004 |
| JP | 2004-214054 | 7/2004 |
| JP | 2004-281317 | 10/2004 |
| JP | 2004-296386 A | 10/2004 |
| JP | 2004-533699 A | 11/2004 |
| JP | 2005-310759 A | 11/2005 |
| JP | 2006-505901 A | 2/2006 |
| JP | 2006-276214 A | 10/2006 |
| JP | 2006-290938 A | 10/2006 |
| JP | 2006-335410 A | 12/2006 |
| JP | 2007-165079 A | 6/2007 |
| JP | 2008-034266 | 2/2008 |
| JP | 2008-186732 | 8/2008 |
| JP | 2008-234988 | 10/2008 |
| JP | 2009-252348 A | 10/2009 |
| KR | 2007-023141 | 2/2007 |
| KR | 2007-0110569 A | 11/2007 |
| KR | 2008-038806 A | 5/2008 |
| NL | 1015956 | 8/2000 |
| SU | 471402 | 5/1975 |
| SU | 544019 | 1/1977 |
| WO | WO 99/33129 | 7/1999 |
| WO | WO 01/13414 A1 | 2/2001 |
| WO | WO 01/35473 A1 | 5/2001 |
| WO | WO 01/96847 A1 | 12/2001 |
| WO | WO 02/25356 A2 | 3/2002 |
| WO | WO 02/47185 A2 | 6/2002 |
| WO | WO 03/063271 A1 | 7/2003 |
| WO | WO 03/075372 A2 | 9/2003 |
| WO | WO 2004/042851 A2 | 5/2004 |
| WO | WO 2004/052489 A2 | 6/2004 |
| WO | WO 2004/083490 A2 | 9/2004 |
| WO | WO 2005/011030 A1 | 2/2005 |
| WO | WO 2005/113467 A1 | 12/2005 |
| WO | WO 2005/119753 A2 | 12/2005 |
| WO | WO 2006/067891 A1 | 6/2006 |
| WO | WO 2006/073427 A2 | 7/2006 |
| WO | WO 2006070158 A1 * | 7/2006 .............. H01M 4/04 |
| WO | WO 2006/120332 A2 | 11/2006 |
| WO | WO 2007/044315 A1 | 4/2007 |
| WO | WO 2007/083152 | 7/2007 |
| WO | WO 2007/083155 | 7/2007 |
| WO | WO 2007/083155 A1 | 7/2007 |
| WO | WO 2007/114168 A1 | 10/2007 |
| WO | WO 2007/136164 A1 | 11/2007 |
| WO | WO 2008/029888 A1 | 3/2008 |
| WO | WO 2008/044683 A1 | 4/2008 |
| WO | WO 2008/072460 A1 | 6/2008 |
| WO | WO 2008/097723 A1 | 8/2008 |
| WO | WO 2008/139157 A1 | 11/2008 |
| WO | WO 2009/010757 | 1/2009 |
| WO | WO 2009/010758 | 1/2009 |
| WO | WO 2009/010759 | 1/2009 |
| WO | WO 2009/026466 | 2/2009 |
| WO | WO 2009/120404 A1 | 10/2009 |
| WO | WO 2009/128800 | 10/2009 |
| WO | WO 2010/040985 | 4/2010 |
| WO | WO 2010/040986 | 4/2010 |
| WO | WO 2010/060348 A1 | 6/2010 |
| WO | WO 2010/130975 A1 | 11/2010 |
| WO | WO 2010/130976 A1 | 11/2010 |

OTHER PUBLICATIONS

WO 2006070158 A1, English Translation obtained from Google Translate on Nov. 14, 2013.*

Lee et al., "Effect of Poly (Acrylic Acid) on Adhesion Strength and Electrochemical Performance of Natural Graphite Negative Electrode for Lithium-Ion Batteries", Journal of Power Sources, 161(1), (2006), 612-616.

Key to Metal Aluminum-Silicon Alloys, www.keytometals.com/Article80.

Winter, et al., "Insertion Electrode Materials for Rechargeable Lithium Batteries", Advanced Materials, 1998, 10, No. 10.

Kasavajjula et al., "Nano- and Bulk-Silicon-Based Insertion Anodes for Lithium-Ion Secondary Cells", Journal of Power Sources, 163 (2007) 1003-1039.

Peng, et al., "Fabrication of Single-Crystalline Silicon Nanowires by Scratching a Silicon Surface with Catalytic Metal Particles", Adv. Funct. Mater., 16 (2006), 387-394.

Barraclough et al., "Cold Compaction of Silicon Powders Without a Binding Agent", Materials Letters 61 (2007) 485-487.

International Search Report for PCT/GB2008/002453 dated Oct. 9, 2008.

Written Opinion of the International Searching Authority dated Oct. 9, 2008.

Badel et al., "Formation of Ordered Pore Arrays at the Nanoscale by Electrochemical Etching of N-Type Silicon", Superlattices and Microstructures, 36 (2004) 245-253.

Beaulieu et al., "Colossal Reversible Volume Changes in Lithium Alloys", Electrochemical and Solid-State Letters, 4 (9) (2001) A137-A140.

Beaulieu et al., "Reaction of Li with Grain-Boundary Atoms in Nanostructured Compounds", Journal of the Electrochemical Society, 147 (9) (2000) 3206-3212.

Besenhard et al., "Will Advanced Lithium-Alloy Anodes Have a Chance in Lithium-Ion Batteries?", Journal of Power Sources, 68 (1997) 87-90.

(56) References Cited

OTHER PUBLICATIONS

Boukamp et al., "All-Solid Lithium Electrodes with Mixed-Conductor Matrix", J. Electrochem. Soc.: Electrochemical Science and Technology, vol. 128, No. 4, (1981) 725-729.
Bourderau, et al., "Amorphous Silicon as a Possible Anode Material for Li-Ion Batteries", Journal of Power Sources, 81-82 (1999) 233-236.
Colinge, Jean-Pierre, "Silicon-on-Insulator Technology: Materials to VLSI", Chapter 2, SOI Materials, (1991), Cover page and p. 38.
Deal et al., "General Relationship for the Thermal Oxidation of Silicon", Journal of Applied Physics, vol. 36, No. 12, (Dec. 1965) 3770-3778.
Feng et al., "Lithography-Free Silicon Micro-Pillars as Catalyst Supports for Microfabricated Fuel Cell Applications", Electrochemistry Communications, 8 (2006).
Green et al., "Quantum Pillar Structures on n+ Gallium Arsenide Fabricated Using "Natural" Lithography", Appl. Phys. Lett., 62 (3) (1993) 264-266.
Green et al., "Structured Silicon Anodes for Lithium Battery Applications", Electrochemical and Solid-State Letters, 6 (5) (2003) A75-A79.
Green et al., "Mesoscopic Hemisphere Arrays for use as Resist in Solid State Structure Fabrication", J. Vac. Sci. Technol. B 17(5) (1999) 2074-2083.
Yan et al., "Growth of Amorphous Silicon Nanowires via a Solid-Liquid-Solid Mechanism", Chemical Physics Letters, 323 (2000) 224-228.
Shin et al., "Porous Silicon Negative Electrodes for Rechargeable Lithium Batteries", Journal of Power Sources, 139 (2005) 314-320.
Li et al., "A High Capacity Nano-Si Composite Anode Material for Lithium Rechargeable Batteries", Electrochemical and Solid-State Letters, 2 (11) (1999) 547-549.
Li et al., "The Crystal Structural Evolution of Nano-Si Anode Caused by Lithium Insertion and Extraction at Room Temperature", Solid State Ionics, 135 (2000) 181-191.
Huggins, Robert A., "Lithium Alloy Anodes" in Handbook of Battery aterials, J.O. Besenhard Ed., Wiley-VCH, Weinheim, 361-381 (1999).
Chang et al., "Ultrafast Growth of Single-Crystalline Si Nanowires", Materials Letters, 60 (2006) 2125-2128.
Kim et al., "Improvement of Silicon Powder Negative Electrodes by Copper Electroless Deposition for Lithium Secondary Batteries", Journal of Power Sources, 147 (2005) 227-233.
Jianfeng et al., "Large-Scale Array of Highly Oriented Silicon-Rich Micro/Nanowires Induced by Gas Flow Steering", Solid State Communications, 133 (2005) 271-275.
Lu et al., "A Study of the Mechanisms of Erosion in Silicon Single Crystals Using Hertzian Fracture Tests", Wear, 186-187 (1995) 105-116.
Kleimann et al., "Formation of Wide and Deep Pores in Silicon by Electrochemical Etching", Materials Science and Engineering, B69-70 (2000) 29-33.
Kolasinski, Kurt W., "Silicon Nanostructures from Electroless Electrochemical Etching", Current Opinion in Solid State and Materials Science, 9 (2005) 73-83.
Pei et al., "Silicon Nanowires Grown from Silicon Monoxide Under Hydrothermal Conditions", Journal of Crystal Growth, 289 (2006) 423-427.
Chen et al., "Selective Etching of Silicon in Aqueous Ammonia Solution", Sensors and Actuators, A 49 (1995) 115-121.
Maranchi et al., "Interfacial Properties of the a-Si/Cu:Active-Inactive Thin-Film Anode Systems for Lithium-Ion Batteries", Journal of the Electrochemical Society: 153 (6) (2006) A1246-A1253.
Nakahata et al., "Fabrication of Lotus-Type Porous Silicon by Unidirectional Solidification in Hyrdogen", Materials Science and Engineering A 384 (2004) 373-376.
Niparko, J.K. (Editor), "Cochlear Implant Technology", Pub., Lippincott Williams and Wilkins, Philadelphia, (2000) 108-121.

Ohara et al., "A Thin Film Silicon Anode for Li-Ion Batteries Having a Very Large Specific Capacity and Long Cycle Life", Journal of Power Sources, 136 (2004) 303-306.
Peng et al., "Dendrite-Assisted Growth of Silicon Nanowires in Electroless Metal Deposition", Adv. Funct. Mater., 13, No. 2 (2003) 127-132.
Peng et al., "Synthesis of Large-Area Silicon Nanowire Arrays via Self-Assembling Nanoelectrochemistry", Adv. Mater., 14, No. 16 (2002) 1164-1167.
Peng et al., "Uniform, Axial-Orientation Alignment of One-Dimensional Single-Crystal Silicon Nanostructure Arrays", Angew. Chem. Ind. Ed., 44 (2005) 2737-2742.
Peng et al., "Simultaneous Gold Deposition and Formation of Silicon Nanowire Arrays", Journal of Electroanalytical Chemistry, 558 (2003) 35-39.
Canham, L. T., "Diffusion of Li IN Si", Properties of Silicon, EMIS Datareviews Series No. 4 (1987) 454-462.
Qiu et al., "Self-Assembled Growth and Optical Emission of Silver-Capped Silicon Nanowires", Applied Physics Letters, vol. 84, No. 19, (2004) 3867-3869.
Kim et al., "(110) Silicon Etching for High Aspect Ratio Comb Structures", 1997 6th International Conference on Emerging Technologies and Factory Automation Proceedings, (1997) 248-252.
Sharma et al., "Thermodynamic Properties of the Lithium-Silicon System", J. Electrochem. Soc.: Electrochemical Science and Technology, vol. 123 (1976) 1763-1768.
Qiu et al., "From S1 Nanotubes to Nanowires: Synthesis, Characterization, and Self-Assembly", Journal of Crystal Growth, 277 (2005) 143-148.
Tokoro et al., "Anisotropic Etching Properties of Silicon in KOH and TMAH Solutions", Proceedings of the 1998 International Symposium on Micromechatronics and Human Science (1998) 65-70.
Tsuchiya et al., "Structural Fabrication Using Cesium Chloride Island Arrays as a Resist in a Fluorocarbon Reactive Ion Etching Plasma", Electrochemical and Solid-State Letters, 3 (1) (2000) 44-46.
Wagner et al., "Vapor-Liquid-Solid Mechanism of Single Crystal Growth", Applied Physics Letters, vol. 4, No. 5 (1964) 89-90.
Lang, Walter, "Silicon Microstructuring Technology", Materials Science and Engineering, R17 (1996) 1-55.
Liu et al., "Effect of Electrode Structure on Performance of Si Anode in Li-Ion Batteries: Si Particle Size and Conductive Additive", Journal of Power Source, 140 (2005) 139-144.
Yan et al., "$H_2$-Assisted Control Growth of Si Nanowires", Journal of Crystal Growth, 257 (2003) 69-74.
Liu et al., "A Novel Method of Fabricating Porous Silicon Material: Ultrasonically Enhanced Anodic Electrochemical Etching", Solid State Communications, 127 (2003) 583-588.
Zhang et al., "Bulk-Quantity Si Nanowires Synthesized by SiO Sublimation", Journal of Crystal Growth, 212 (2000) 115-118.
Wong et al., "Controlled Growth of Silicon Nanowires Synthesized Via Solid-Liquid-Solid Mechanism", Science and Technology of Advanced Materials, 6 (2005) 330-334.
Zhang et al., "Synthesis of Thin Si Whiskers (Nanowires) Using $SiCl_4$", Journal of Crystal Growth, 2006 (2001) 185-191.
Yoshio et al., "Electrochemical Behaviors of Silicon Based Anode Material", Journal of Power Sources, 153 (2006) 375-379.
Zhang et al., "Catalytic Growth of $^x$-$FiSi_2$ and Silicon Nanowires", Journal of Crystal Growth, 280 (2005) 286-291.
Ivanovskaya et al., "The Effect of Treatment of Cation-Selective Glass Electrodes With $AgNO3$ Solution on Electrode Properties", Sensors and Actuators B 24-25 (1995) 304-308.
Peng et al., "Fabrication of Large-Area Silicon Nanowire p-n Junction Diode Arrays", Adv. Mater. (2004), vol. 16, No. 1, 73-76.
Peng et al., "Silicon Nanowires for Rechargeable Lithium-ion Battery Anodes", Applied Physics Letters (2008) vol. 93, No. 3, pp. 33105-1 to 33105-3.
De Angelis et al., "Water Soluble Nanoporous Nanoparticles for In Vivo Targeted Drug Deliver and Controlled Release in B Cells Tumor Context", Nanoscale, 1020, vol. 2, p. 2230-2236.
Sharma et al., Diameter control of Ti-catalyzed silicon nanowires, J. Crystal Growth, 267, 613-18 (2004).

(56) References Cited

OTHER PUBLICATIONS

Tang et al., "High dispersion and electrocatalytic properties of platinum on well-aligned carbon nanotube arrays," Carbon, 42, 191-97 (2004).

De Angelis et al., "Water Soluble Nanoporous Nanoparticles for In Vivo Targeted Drug Deliver and Controlled Release in B Cells Tumor Context", Nanoscale, 1020, vol. 2, p. 2230-2236, (Year 2010).

Garrido, et al., The Role of Chemical Species in the Passivation of <100> Silicon Surfaces by HF in Water-Ethanol Solutions, J. Electrochem Soc., vol. 143, No. 12, 1996, p. 4059-4066.

Russo, et al., "A Mechanical Approach to Porous Silicon Nanoparticles Fabrication", Materials 2011, vol. 4, p. 1023-1033.

Takami et al., "Silicon Fiber Formed on Silicon Without Using a Gas Process", Journal of Applied Physics, vol. 91, No. 12, 2-5 (2002).

Ye et al., Controllable Growth of Silver Nanostructures by a Simple Replacement Reaction and Their SERS Studies, Solid State Sciences 11 (2009), p. 1088-1093.

Chan et al., "Surface Chemistry and Morphology of the Solid Electrolyte Interphase on Silicon Nanowire Lithium-Ion Battery Anodes", Journal of Power Sources, 189(2), 1132-1140, (2009).

Chen et al., Binder Effect on Cycling Performance of Silicon/Carbon Composite Anodes for Lithium Ion Batteries, 36 (2006) 1099-1104.

Chen et al., "Effect of Vinylene Carbonate (VC) as Electrolyte Additive on Electrochemical Performance of Si Film Anode for Lithium Ion Batteries", Journal of Power Sources, 174(2), 538-543, (2007).

Chevrier et al., "Methods for Successful Cycling of Alloy Negative Electrodes in Li-Ion Cells", 220th ECS Meeting, Abstract #1237 (2011).

Choi et al., "Effect of Fluoroethylene Carbonate Additive on Interfacial Properties of Silicon Thin-Film Electrode", Journal of Power Sources, 161(2), 1254-1259 (2006).

El Ouatani et al., "The Effect of Vinylene Carbonate Additive on Surface Film Formation on Both Electrodes in Li-Ion Batteries", J. Electrochem. Soc., 156(2), A103-A113 (2009).

Han et al., "Neutralized Poly (Acrylic Acid) as Polymer Binder for High Capacity Silicon Negative Electrodes", 220th ECS Meeting, Abstract #1250 (2011).

Heinze et al., "Viscosity Behaviour of Multivalent Metal Ion-Containing Carboxymethyl Cellulose Solutions", Die Angewandte Makromolekulare Chamie 220, 123-132, (Nr. 3848), (1994).

Hochgatterer et al., "Silicon/Graphite Composite Electrodes for High Capacity Anodes: Influence of Binder Chemistry on Cycling Stability", Electrochemical and Solid-State Letters, 11 (5) (2008) A76-A80.

Komba et al., "Functional Interface of Polymer Modified Graphite Anode", Journal of Power Sources, 189, (2009), 197-203.

Komba et al., "Polyacrylate as Functional Binder for Silicon and Grapite Composite Electrode in Lithium-Ion Batteries", Electrochemistry, 79(1), (2011), 6-9.

Komba et al., "Polyacrylate Modifier for Graphite Anode of Lithium-Ion Batteries", Electrochemical and Solid-State Letters, 12(5), (2009), A107-A110.

Komba et al., "Study on Polymer Binders for High-Capacity SiO Negative Electrode of Li-Ion Batteries", Journal of Physical Chemistry, 115, (2011), 13487-13495.

Lee et al., "Effect of Poly (Acrylic Acid) on Adhesion Strength and Electrochemical Performance of Natural Graphite Negative Electrode for Lithium-Ion Batteries", Journal of Power Sources, 161(1) (2006), 612-616.

Li et al., "Sodium Carboxymethyl Cellulose: A Potential Binder for Si Negative Electrodes for Li-Ion Batteries", Electrochemical and Solid-State Letters, 10(2) (2007), A17-A20.

Liu et al., "Enhanced Cycle Life of Si Anode for Li-Ion Batteries by Using Modified Elastomeric Binder", Electrochemical and Solid-State Letters, 8(2) (2005), A100-A103.

Obrovac et al., "Structural Changes in Silicon Anodes During Lithium Insertion/Extraction", Electrochemical and Solid-State Letters, 7(5), (2004), A96-A96.

Sugama, et al., "Nature of Interfacial Interaction Mechanisms Between Polyacrylic Acid Macromolecules and Oxide Metal Surfaces", Journal of Materials Science, 19 (1984) 4045-4056.

Ui et al., "Improvement of Electrochemical Characteristics of Natural Graphite Negative Electrode Coated With Polyacrylic Acid in Pure Propylene Carbonate Electrolyte", Journal of Power Sources, 173(1), (2007), 518-521.

Wen et al., "Chemical Diffusion in Intermediate Phases in the Lithium-Silicon System", Journal of Solid State Chemistry, 37 (1981) 271-278.

Weydanz et al., "A Room Temperature Study of the Binary Lithium-Silicon and the Ternary Lithium-Chromium-Silicon System for use in Rechargeable Lithium Batteries", Journal of Power Sources, 81-82 (1999) 237-242.

Yabuuchi et al., "Graphite-Silicon-Polyacrylate Negative Electrodes inlonic Liquid Electrolyte for Safer Rechargeable Li-Ion Batteries", Advanced Energy Materials, 1, (2011), 759-765.

Zhang et al., "A Review on Electrolyte Additives for Lithium-Ion Batteries", Journal of Power Sources, 162(2), 1379-1394, (2006).

Key to Metal Aluminum-Silicon Alloys, www.keytometals.com/Article80, Oct. 26, 2011.

\* cited by examiner

ELECTRODE COMPRISING STRUCTURED SILICON-BASED MATERIAL

CROSS-REFERENCE TO RELATED APPLICATION

This applications claims priority from United Kingdom Application Serial No. 0713896.9, filed Jul. 17, 2007, the entire content of which is hereby incorporated by reference, and is a U.S. national stage application under 35 U.S.C. §371 of PCT/GB08/02453, filed Jul. 17, 2008, the entire content of which is hereby incorporated by reference.

BACKGROUND

The invention relates to a method of fabricating a composite electrode comprising an active component directly bonded to a current collector and its use as the active anode material in rechargeable lithium battery cells.

DETAILED DESCRIPTION

Figure 1:
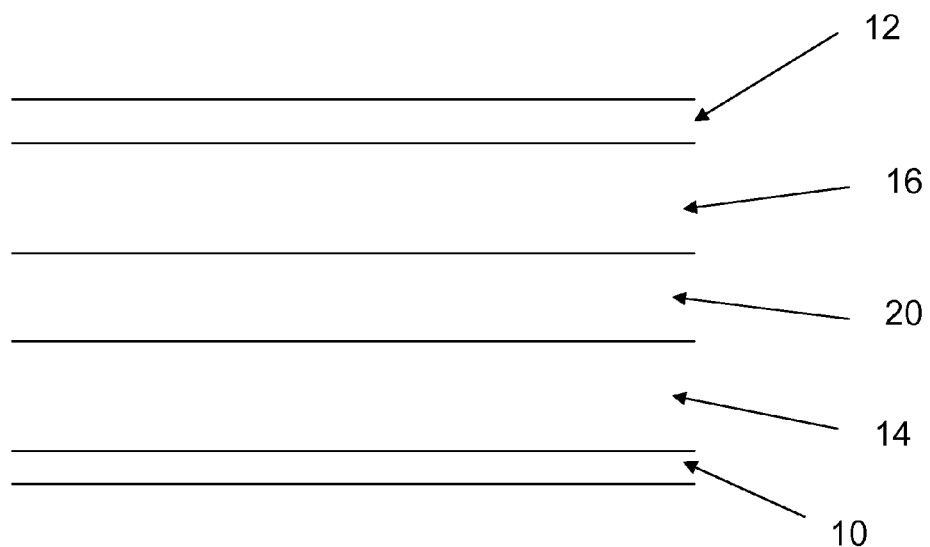
FIG. 1 is a schematic view of a lithium battery cell.

Lithium battery cells, as illustrated in FIG. 1, are well known in the art. A battery cell generally comprises a copper current collector for the anode 10 and an aluminium current collector for the cathode 12 which are externally connectable to a load or to a recharging source as appropriate. A graphite-based composite anode layer 14 overlays the current collector 10 and a lithium containing metal oxide-based composite cathode layer 16 overlays the current collector 12. A porous plastic spacer or separator 20 is provided between the graphite-based composite anode layer 14 and the lithium containing metal oxide-based composite cathode layer 16 and a liquid electrolyte material is dispersed within the porous plastic spacer or separator 20, the composite anode layer 14 and the composite cathode layer 16. In some cases, the porous plastic spacer or separator 20 may be replaced by a polymer electrolyte material and in such cases the polymer electrolyte material is present within both the composite anode layer 14 and the composite cathode layer 16.

A number of investigations have been carried out using silicon as the active anode material of a rechargeable lithium-ion electrochemical cell (see, for example, Insertion Electrode Materials for Rechargeable Lithium Batteries, M. Winter, J. O. Besenhard, M. E. Spahr, and P. Novak in Adv. Mater. 1998, 10, No. 10). The silicon anode would replace the graphite-based anode electrode in the conventional lithium-ion rechargeable battery cell illustrated in FIG. 1 The battery cell includes a single cell but may also include more than one cell. The silicon electrode structure generally utilises powdered silicon, evaporated silicon or fibres of silicon which are attached onto a current collector with a polymer binder and an electronic additive by a solvent casting process to form a composite electrode structure.

It will be appreciated that the formation of a conventional composite electrode requires multiple components hence increasing the cost and complexity of the production of the electrode. Furthermore, the use of a solvent casting process results in the formation of waste solvent, which requires costly disposal. It will be further appreciated that, in order to allow the battery to deliver high levels of power, it is very important to create a low resistance contact between the active material and the current collector and this can be hard to achieve in a composite film electrode structure. In addition, the low resistance contacts will be preserved during the volume changes induced by charging and discharging the electrode in an electrochemical cell.

The present invention provides an improved method of composite electrode production. In particular, the first aspect of the invention provides a composite electrode comprising an active component directly bonded to a current collector. The direct bonding provides a low resistance contact between the current collector and the active material.

It will be appreciated that the electrode of the first aspect does not require the use of a polymer binder and an electronic additive. Instead the active component is directly bonded to the current collector by the formation of a compound between the active component and the current collector. Furthermore, the production of the composite electrode is not carried out using a solvent casting process thus avoiding the use of solvent and the need to dispose of waste solvent.

For the purposes of the present invention, the active component and the current collector are directly bonded such that a physical and/or chemical interaction occurs between the active component and the current collector. In particular, the physical and/or chemical interaction occurs at the interface between the active component and the current collector (i.e. at the contacting surfaces of the active component and the current collector). The direct bonding of the active component and the current collector results in a permanent or temporary attachment. The bonding can therefore be irreversible or reversible. The bonding can result in an interaction at an atomic or molecular level between the active component and the current collector. In particular, the interaction may result in chemical bonding between the active component and the current collector such as covalent, ionic, van der Waals bonding or the formation of an alloy, such as a metal alloy. The direct bonding causes the active component and the current collector to adhere to each other. It will be appreciated that the direct bonding causes a physical and/or chemical change in the contacting surfaces of the active component and/or the current collector.

The direct bonding of the active component and the current collector can result in the formation of a compound between the active component and the current collector. In this case, the direct bonding of the active component and the current collector is via the compound formed between the active component and the current collector. The compound therefore has two functions. It causes the adherence of the active component to the current collector and allows electrons to be conducted therethrough. The compound therefore provides a high conductivity and low resistance binding between the current collector and the active component.

The active component of the electrode preferably comprises one or more of silicon, aluminium, tin, lead, bismuth, antimony or silver. The current collector of the electrode preferably comprises one or more of copper, nickel, aluminium, iron, iridium, gold, silver or titanium. The electrode of the first aspect can therefore comprise for example, an active component comprising silicon directly bonded via a silicon-copper compound to a copper current collector.

In a preferred feature of the invention, the active component comprises silicon, more preferably silicon-comprising fibres. In a particular feature of the invention, the silicon-comprising fibres are single crystal fibres.

The silicon comprising fibres may have transverse dimensions in the range 0.08 to 0.5 microns, preferably 0.2 microns and a length in the range 12 to 300 microns preferably 100 microns. The fibres may have an aspect ratio of about 250:1. The fibres may have a substantially circular cross-section or a substantially non-circular cross-section.

The composite electrode of the first aspect is preferably provided as an anode.

The second aspect of the invention provides a method of fabricating a composite electrode according to the first aspect of the invention comprising contacting an active component with a current collector and heating to the reaction temperature of the active component and current collector. Alternatively, the active component and the current collector are heated to above their reaction temperature.

For the purposes of this invention, the reaction temperature is the temperature required to form a direct bond between the active component and the current collector, in particular to form to a compound between the active component and the current collector. It will be appreciated that the required temperature will vary depending on the identity (i.e. the chemical composition) of the active component and the current collector.

The method of the second aspect requires that the active component and the current collector are brought into contact. Preferably the active component and the current collector are contacted under an excess pressure of 5 pounds per square inch or above, more preferably 5 atmospheres or above.

It will be appreciated that it is advisable to avoid the formation of excess metal oxides at the contacting surfaces of the active component and/or the current collector. The method of the second aspect is therefore preferably carried out in an inert atmosphere, such as nitrogen, argon etc or in vacuo.

In a preferred feature of the second aspect there is provided a method of fabricating an electrode comprising contacting a silicon comprising active component with a copper current collector and heating to or above the silicon-copper alloy temperature.

As discussed in relation to the first aspect of the invention, the silicon comprising active component can be provided as fibres of silicon, said fibres being free or attached to a support. The fibres of the present invention can be created from a substrate (e.g. a chip or a wafer) comprising silicon by reactive ion etching, chemical reaction etching or galvanic exchange etching and, where applicable, detached by one or more of scraping, agitating or chemical etching.

The silicon-comprising active component can comprise undoped silicon, doped silicon or a silicon germanium mixture. The fibre can be single crystal silicon or single crystal silicon germanium. The fibres may extend from silicon-comprising particles.

The fibres of silicon can be contacted on the current collector in a composite or felt or a felt-like structure, that is a plurality of elongate or long thin fibres which crossover to provide multiple intersections, for example by being laid down in a random or disordered or indeed ordered manner. The arrangement of the active component in this fashion, reduces the problem of charge/discharge capacity loss. Typically the fibres will have a length to diameter ratio of approximately 100:1 and hence in an anode layer such as a composite anode layer, each fibre will contact other fibres many times along their length giving rise to a configuration where the chance of mechanical isolation arising from broken silicon contacts is negligible. The insertion and removal of lithium into the fibres, although causing volume expansion and volume contraction, does not cause the fibres to be destroyed and hence the intra-fibre electronic conductivity is preserved.

The active component and the current collector are brought into contact and form an interaction at the contacting surfaces. The interaction results in a change in the structure and/or composition of the active component and/or the current collector at the contacting surfaces, such that the active component and the current collector are bonded together. This bonding can be irreversible or reversible. Preferably, the active component and the current collector form a metal alloy at the contacting surfaces. The invention does not encompass merely contacting the active component and the current collector (i.e. by plating or depositing the active component on the current collector) and hence creates a very low electrical resistance pathway between the current collector and the active material.

The third aspect of the invention provides a method of fabricating a lithium rechargeable cell comprising the steps of creating an anode according to the second aspect of the invention and adding a cathode and an electrolyte. The method of the third aspect may further comprise adding a separator between cathode and the anode, and additionally further providing a casing around the cell.

The fourth aspect of the invention provides an electrochemical cell containing an anode according to the present invention. The fourth aspect in particular provides an electrochemical cell in which the cathode comprises a lithium-containing compound capable of releasing and reabsorbing lithium ions as its active material. More particularly, there is provided an electrochemical cell in which the cathode comprises lithium-based metal oxide or phosphate as its active material preferably $LiCoO_2$ or $LiMn_xNi_xCo_{1-2x}O_2$ or $LiFePO_4$.

The fifth aspect of the invention provides a lithium rechargeable cell anode comprising an active component directly bonded to a current collector.

The sixth aspect of the invention provides a cell comprising an anode as described in the fifth aspect of the invention and a cathode. In particular, the cathode comprises lithium-based material, preferably the cathode comprises lithium cobalt dioxide.

The seventh aspect of the invention provides a device powered by a cell as described above.

The present invention is illustrated with reference to one or more of the following non-limiting examples:

The silicon fibres may be manufactured by detaching pillars from a substrate such as a chip or a wafer. In addition the manner of fabrication of the pillars may be provided by a simple repeatable chemical process.

One manner in which the pillars can be made is by dry etching, for example deep reactive ion etching of the type, for example, described in U.S. application Ser. No. 10/049,736 which is commonly assigned herewith and incorporated herein by reference. The skilled person will be familiar with the process such that detailed description is not required here. Briefly, however, a silicon substrate coated in native oxide is etched and washed so as to give a hydrophilic surface. Caesium chloride (CsCl) is evaporated on the surface and the coated substrate is transferred under dry conditions to a chamber of fixed water vapour pressure. A thin film of CsCl develops into an island array of hemispheres whose dimensional characteristics depend on initial thickness, water vapour pressure and time of development. The island array provides an effective mask after which etching is carried out for example by reactive ion etching leaving an array of pillars corresponding to the hemispherical islands. The CsCl resist layer is highly soluble in water and can be readily washed away.

Alternatively the pillars can be made by wet etching/using a chemical galvanic exchange method for example as described in our co-pending application GB 0601318.9 with common assignees and entitled "Method of etching a silicon-based material", incorporated herewith by reference. A related method which may also be used has been disclosed in Peng K-Q, Yan, Y-J Gao, S-P, Zhu J., Adv. Materials, 14 (2004), 1164-1167 ("Peng"); K. Peng et al, Angew. Chem. Int. Ed., 44 2737-2742; and K. Peng et al., Adv. Funct. Mater., 16 (2006), 387-394.

In the preferred embodiment pillars of for example 100 microns in length and 0.2 microns in diameter are fabricated on and from a silicon substrate. More generally pillars of length in the range of 12 to 300 microns and diameter or largest transverse dimension in the range of 0.08 to 0.5 microns may be used to provide the fibres. According to the process the silicon substrate may be n- or p-type and, according to the chemical approach, and may be etched on any exposed (100) or (110) crystal face. Since the etching proceeds along crystal planes, the resulting fibres are single crystals. Because of this structural feature, the fibres will be substantially straight facilitating length to diameter ratio of approximately 100:1 and, when in a composite anode layer, allowing each fibre to contact other fibres many times along their length. The etching process can also be carried out either on very large scale integration (VLSI) electronic grade wafers or rejected samples of the same (single crystal wafers). As a cheaper alternative, photovoltaic grade polycrystalline material, as used for solar panels, may also be used.

In order to detach the pillars to obtain the fibres, the substrate, with pillars attached, is placed in a beaker or any appropriate container, covered in an inert liquid such as ethanol and subjected to ultra-sonic agitation. It is found that within several minutes the liquid is seen to be turbid and it can be seen by electron microscope examination that at this stage the pillars have been removed from their silicon base.

It will be appreciated that alternative methods for "harvesting" the pillars include scraping the substrate surface to detach them or detaching them chemically. One chemical approach appropriate to n-type silicon material comprises etching the substrate in an HF solution in the presence of backside illumination of the silicon wafer.

Once harvested, silicon fibres were washed in a dilute HF (1%) solution for several minutes. Water was removed by filtration, but sufficient water was retained to keep the silicon fibres wet. The fibres were dispersed on the copper foil (current collector). The silicon fibres coated copper substrate was then transferred into a Silicon Bonder chamber. At the vacuum of ca $2\times10^{-6}$ mbar, a temperature of 400° C. and a pressure of 5 atmospheres, the silicon fibres annealed with copper for about 1 hour.

Alternatively dry and clean silicon fibres were placed on a copper substrate. The sample was transferred into a Rapid Thermal Annealing chamber and annealed in air or low flowing Argon ambient for 10 s at 800° C. After cooling, the sample was annealed in $H_2/N_2$ (10% $H_2$) for 10 s at 800° C. to reduce the oxide.

Alternatively silicon fibres were coated onto a copper current collector to create a felt or felt-like structure and the sample passed through heated rollers to provide the required temperature and pressure to create the silicon-copper compound.

Figure 2:
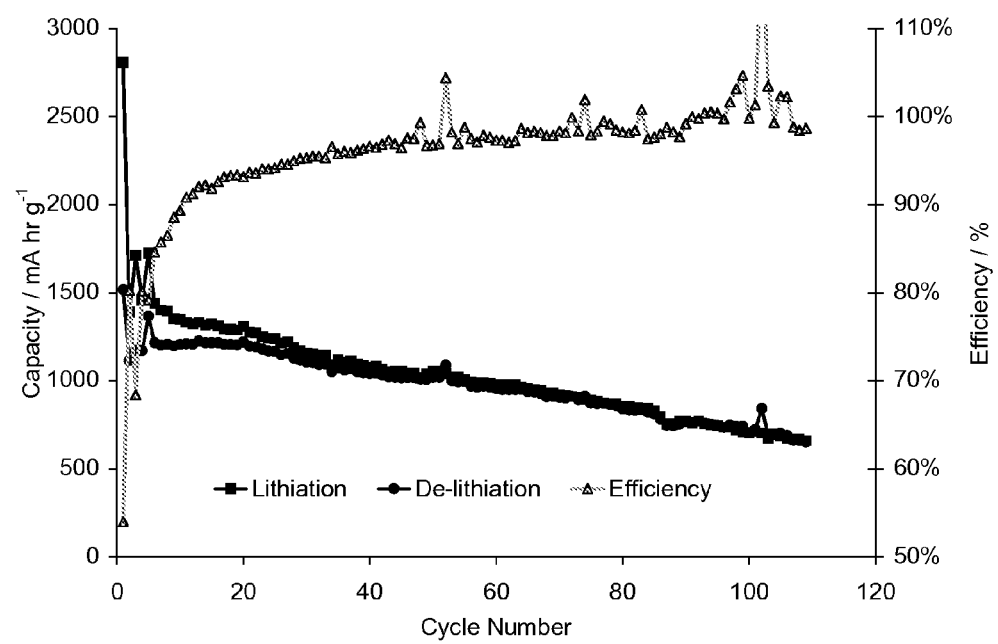
FIG. 2 is a cycle number plot for an electrode produced according to the present disclosure.

FIG. 2 illustrates a cycle number plot for an electrode produced using a Silicon Bonder chamber as described above. The plot shows the capacity of the electrode with repeated cycles of lithiation and delithiation.

A particular advantage of the approach described herein is that large sheets of silicon-based anode can be fabricated, rolled if necessary, and then slit or stamped out subsequently as is currently the case in graphite-based anodes for lithium-ion battery cells meaning that the approach described herein can be retrofitted with the existing manufacturing capability.

Fabrication of the lithium-ion battery cell can be carried out in any appropriate manner, for example following the general structure shown in FIG. 1 but with for example, a silicon or silicon-based active anode material rather than a graphite active anode material. For example, the silicon fibres-based composite anode layer is covered by the porous spacer 18, the electrolyte added to the final structure saturating all the available pore volume. The electrolyte addition is done after placing the electrodes in an appropriate casing and may include vacuum filling of the anode to ensure the pore volume is filled with the liquid electrolyte.

It will be appreciated, of course, that any appropriate approach can be adopted in order to arrive at the approaches and apparatus described above. For example the pillar detaching operation can comprise any of a shaking, scraping, chemical or other operation as long as pillars are removed from the substrate to create fibres. Reference to silicon-based material includes silicon where appropriate. The fibres can have any appropriate dimension and can for example be pure silicon or doped silicon or other silicon-based material such as a silicon-germanium mixture or any other appropriate mixture. The substrate from which pillars are created may be n- or p-type, ranging from 100 to 0.001 Ohm cm, or it may be a suitable alloy of silicon, for example $Si_xGe_{1-x}$. The fibres may be grown on particles of silicon such that they do not have to be detached. The fibres can be used for any appropriate purpose such as fabrication of electrodes generally including cathodes. The cathode material can be of any appropriate material, typically a lithium-based metal oxide or phosphate material such as $LiCoO_2$, $LiMn_xNi_xCo_{1-2x}O_2$ or $LiFePO_4$. The features of different embodiments can be interchanged or juxtaposed as appropriate and the method steps performed in any appropriate order.

The invention claimed is:

1. An electrode comprising an active component directly bonded to a current collector, wherein the active component comprises silicon-comprising fibres arranged in a felt-like structure in which the fibres cross over to provide multiple intersections, such that the fibres contact others of the fibres a plurality of times along their lengths and the direct bonding is via a compound formed from the active component and the current collector at contacting surfaces of the active component and the current collector.

2. The electrode as claimed in claim 1 wherein the active component comprises one or more of silicon, aluminium, tin, lead, bismuth, antimony and silver.

3. The electrode as claimed in claim 1 wherein the current collector comprises one or more of copper, nickel, aluminium, iron, iridium, gold, silver or titanium.

4. The electrode as claimed in claim 1 in which the fibres are single crystal fibres.

5. The electrode as claimed in claim 1 in which the fibres are deposited in a composite.

6. The electrode as claimed in claim 1 wherein at least some of the fibres extend from silicon-comprising particles.

7. The electrode as claimed in a claim 1 in which the electrode is an anode.

8. An electrochemical cell containing an anode as claimed in claim 1.

9. The electrochemical cell as claimed in claim 8 in which the cathode comprises a lithium-containing compound capable of releasing and readsorbing lithium ions as its active material.

10. The electrochemical cell as claimed in claim 8 in which the cathode comprises lithium-based metal oxide or phosphate as its active material preferably $LiCoO_2$ or $LiMn_xNi_xCo_{1-2x}O_2$ or $LiFePO_4$.

11. A cell comprising an anode as claimed in claim 1 and a cathode.

12. A cell as claimed in claim 11 in which the cathode comprises lithium-based material.

13. A cell as claimed in claim 12 in which the cathode comprises lithium cobalt dioxide-based material.

14. A device powered by a cell as claimed in claim 11.

15. The electrode as claimed in claim 1 wherein the fibres comprise n-type or p-type doped silicon.

16. The electrode as claimed in claim 1 wherein the electrode is a composite anode.

17. A lithium-ion battery comprising the electrode as claimed in claim 1 and further comprising a cathode and electrolyte.

18. An electrode comprising an active component directly bonded to a current collector, wherein the active component comprises a plurality of silicon-comprising particles, each particle having a plurality of silicon-comprising fibres extending therefrom, the plurality of silicon-comprising particles being disposed on the current collector such that fibres crossover to provide multiple intersections, such that the fibres contact others of the fibres a plurality of times along their lengths, and the direct bonding is via a compound formed from the active component and current collector at the contacting surfaces of the active component and current collector.

19. The electrode of claim 18 wherein the fibres comprise n-type or p-type doped silicon.

20. The electrode of claim 18 wherein the electrode is a composite anode.

21. A lithium-ion battery comprising the electrode as claimed in claim 18 and further comprising a cathode an electrolyte.

* * * * *